2,850,353

PREPARATION OF THIOPHOSPHORYL CHLORIDE

George F. Kerkmas, Nitro, Thomas E. Lesslie, St. Albans, and Richard O. Zerbe, Nitro, W. Va., assignors to Monsanto Chemical Company, St. Louis, Mo., a corporation of Delaware No Drawing. Application July 22, 1953
Serial No. 369,708

1 Claim. (Cl. 23—14)

The present invention relates to the preparation of thiophosphoryl chloride by the reaction of phosphorus trichloride and sulfur. More particularly the invention is directed to improvements in the method of combining sulfur and phosphorus trichloride.

Drastic conditions are required for effecting the direct combination of sulfur and phosphorus trichloride. Since the latter as well as the desired product are volatile liquids of relatively low boiling points, temperatures sufficiently high for reaction cannot be achieved conveniently except by using an efficient catalyst. While the reaction is known to be catalyzed by aluminum chloride, attempts to substitute the cheaper ferric chloride have not heretofore been successful. Excessive proportions have been required so that the use of ferric chloride has not been economical.

It has now been discovered that the gradual addition of phosphorus trichloride containing dissolved ferric chloride to a hot mixture of sulfur and ferric chloride effects formation of thiophosphoryl chloride with economical proportions of catalyst. The reaction takes place rapidly at the refluxing temperature of thiophosphoryl chloride so that reaction under pressures greater than atmospheric is unnecessary. The admixture of sulfur and catalyst is preferably heated to 130–140° C. prior to adding the phosphorus trichloride-catalyst mixture. The temperature of the reaction mixture gradually falls to about 120° C. and the vapor temperature to 120–123° C. It is desirable to maintain the reaction under refluxing conditions whereby rapid conversion is effected. The rate of addition of phosphorus trichloride is desirably adjusted so that a vapor temperature of at least 120° C. is maintained. In other words the rate of addition is essentially the rate of conversion.

For optimum results the ferric chloride added to the reactor with the sulfur should be about 0.73% of the phosphorus trichloride to be converted. Thus about 1 part ferric chloride per mole of phosphorus trichloride should be used. Amounts in the range of 1–4 parts by weight per mole of phosphorus trichloride have been used successfully. As for the composition comprising ferric chloride dissolved in phosphorus trichloride, concentrations of 0.18% to 1.4% ferric chloride by weight have given satisfactory results. Concentrations in the range of 0.18%–0.26% by weight have given results as good as higher concentrations and are therefore preferred.

The following examples will further illustrate the invention.

*Example 1*

A reactor fitted with a reflux condenser, thermometer, and dropping funnel was charged with 35.3 grams of sulfur and 2 grams of anhydrous ferric chloride. The mixture was heated to 140° C. and 137.4 grams of phosphorus trichloride containing 0.25 gram anhydrous ferric chloride dissolved therein was gradually added to the sulfur-catalyst mixture. The temperature of the reactor gradually dropped but the vapor temperature did not drop below about 120° C. The total heating time including the time of addition of the phosphorus trichloride was about 150 minutes. The reaction mixture was then fractionated to obtain 153 grams of thiophosphoryl chloride, B. P. 122–124° C. This represents a yield of about 90.5% of the theoretical yield.

When the same reaction was attempted by adding phosphorus trichloride containing no dissolved ferric chloride, the yield was only 12% although 3 grams instead of 2 grams of ferric chloride were used in admixture with 35.3 grams of sulfur. Good yields were obtained when the proportion of catalyst was greatly increased but 14 grams of ferric chloride were required for equivalent results.

*Example 2*

A reactor fitted with a reflux condenser, thermometer, and dropping funnel was charged with 35.3 grams of sulfur and 3 grams of ferric chloride. The mixture was heated to 130° C. and then 137.4 grams of phosphorus trichloride having dissolved therein 0.364 gram of ferric chloride gradually added to the hot mixture over a period of about 75 minutes. The temperature of the refluxing vapor did not fall below 120° C. during the addition. A yield of 83.5% of thiophosphoryl chloride, B. P. 123–124° C., was obtained by fractional distillation of the reaction mixture.

*Example 3*

A reactor fitted with reflux condenser, thermometer, and dropping funnel was charged with 35 grams of sulfur and 0.6 gram of anhydrous ferric chloride. The mixture was heated to 140° C. and approximately 77 grams of phosphorus trichloride containing 1.4% by weight anhydrous ferric chloride gradually added to the hot mixture over a period of about 36 minutes. Substantially quantitative conversion to thiophosphoryl chloride was effected.

It is intended to cover all changes and modifications of the examples of the invention herein chosen for purposes of disclosure which do not constitute departures from the spirit and scope of the invention.

What is claimed is:

In the method of making thiophosphoryl chloride by reacting $PCl_3$ and sulfur the process of promoting the reaction which comprises the steps of dissolving in the $PCl_3$ 0.18%–1.4% by weight ferric chloride as a preliminary step, then admixing the solution so prepared with sulfur and ferric chloride, the total ferric chloride being within the range of 0.9% to 2.6% of the $PCl_3$ and heating to effect conversion to thiophosphoryl chloride.

References Cited in the file of this patent

UNITED STATES PATENTS

| | | |
|---|---|---|
| 1,811,602 | Woodstock et al. | June 23, 1931 |
| 2,591,782 | Cook | Apr. 8, 1952 |

OTHER REFERENCES

J. W. Mellor's "A Comprehensive Treatise on Inorganic and Theoretical Chemistry," vol. 8, pages 1012, 1074, Longmans, Green and Co., N. Y.